United States Patent
Jamil et al.

(10) Patent No.: US 7,725,683 B2
(45) Date of Patent: May 25, 2010

(54) APPARATUS AND METHOD FOR POWER OPTIMIZED REPLAY VIA SELECTIVE RECIRCULATION OF INSTRUCTIONS

(75) Inventors: Sujat Jamil, Chandler, AZ (US); Hang Nguyen, Tempe, AZ (US); Samantha J. Edirisooriya, Tempe, AZ (US); David E. Miner, Chandler, AZ (US); R. Frank O'Bleness, Tempe, AZ (US); Steven J. Tu, Phoenix, AZ (US)

(73) Assignee: Marvell International Ltd., Hamilton (BM)

( * ) Notice: Subject to any disclaimer, the term of this patent is extended or adjusted under 35 U.S.C. 154(b) by 1071 days.

(21) Appl. No.: 10/671,844

(22) Filed: Sep. 25, 2003

(65) Prior Publication Data

US 2005/0071603 A1  Mar. 31, 2005

(51) Int. Cl.
*G06F 9/00* (2006.01)

(52) U.S. Cl. ...................................................... 712/214

(58) Field of Classification Search ................... 712/214
See application file for complete search history.

(56) References Cited

U.S. PATENT DOCUMENTS 6,237,081 B1 * 5/2001 Le et al. ..................... 712/214
6,385,715 B1 * 5/2002 Merchant et al. ............ 712/219

* cited by examiner

*Primary Examiner*—Eddie P Chan
*Assistant Examiner*—Robert Fennema

(57) ABSTRACT

A method and apparatus for power optimized replay. In one embodiment, the method includes the issuance of an instruction selected from a queue. Once issued, the instruction may be enqueued within a recirculation queue if completion of the instruction is blocked by a detected blocking condition. Once enqueued, instructions contained within the recirculation queue may be reissued once a blocking condition of an instruction within the recirculation queue is satisfied. Accordingly, a power optimized replay scheme as described herein optimizes power while retaining the advantages provided by selectively replaying of blocked instructions to improve power efficiency.

18 Claims, 12 Drawing Sheets

APPARATUS AND METHOD FOR POWER OPTIMIZED REPLAY VIA SELECTIVE RECIRCULATION OF INSTRUCTIONS

FIELD OF THE INVENTION

One or more embodiments of the invention relate generally to the field of processor architectures. More particularly, one or more of the embodiments of the invention relates to a method and apparatus for power optimized replay.

BACKGROUND OF THE INVENTION

Within a processor that functions according to a serial execution model, a program counter sequences through instructions one-by-one, issuing one instruction before starting the next. As a result, any parallelism that could be controlled by a microprogram of the processor is limited to the execution of a single instruction. By way of contrast, pipelined processors do not follow a serial execution model. Within a pipelined processor, at any one time, one portion of a given instruction is processed in the pipeline. However, other portions of a number of different instructions are also simultaneously processed to provide concurrent execution of portions of a number of instructions. Accordingly, a pipeline is a structure that consists of a sequence of stages through which instructions may flow with the property that new instructions or operations can be initiated at the start of the pipeline while other operations are in progress within the pipeline. Hence, by using pipelined execution of instructions within processors, multiple instructions may overlap processing in different pipeline stages to improve overall throughput of instructions and speed up program execution time.

Pipelined processors encounter situations known as hazards where a subsequent instruction cannot execute until the completion of a previous instruction. Examples include data hazards where a subsequent instruction needs to see the side effects of a previous instruction in order to execute. A further example is resource hazards where the later instruction needs to use a resource that continues to be occupied by an earlier instruction. Collectively, the various hazards described herein are referred to as "instruction blocking conditions". Conventionally, the situations are handled by using a stalling technique.

In the stalling technique, instructions are not allowed to advance to the next pipeline stages until the earlier, hazard causing instruction has itself advanced to a stage that no longer creates the hazard. Unfortunately, a stall scheme needs to detect that a pipeline advance would cause a hazard in the future and has to prevent the advance. Further, a stall scheme has to stall all instructions in the pipeline behind the hazard victim to prevent instruction loss. This implies a large fan out of the stall condition to enable inputs of pipeline latches presenting another requirement for the early determination of the stall condition.

Usually in high frequency designs, the earlier a condition has to be determined, the more likely it is to become a critical timing path. Furthermore, more recent processors have pipelines, such as cache and memory access pipelines, where dependencies between instructions and adjacent pipelines frequently do not exist. As a result, the cost of stalling an entire pipeline to prevent a hazard, especially one with many stages, is high in terms of performance because it prevents forward progress of hazard free instructions. Therefore, there remains a need to overcome one or more of the limitations in the above-described, existing art.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

A method and apparatus for power optimized replay are described. In one embodiment, the method includes the issuance of an instruction selected from a queue. Once issued, the instruction may be enqueued within a recirculation queue if completion of the instruction is blocked by a detected blocking condition. Once enqueued, instructions contained within the recirculation queue may be reissued once a blocking condition of an instruction within the recirculation queue is satisfied. Accordingly, a power optimized replay scheme as described herein optimizes power while retaining the advantages provided by selectively replaying of blocked instructions to improve power efficiency. As a result, power optimized replay lowers the average power consumed by a processor or device, which in turn can lower thermal constraints and lengthen battery life.

System

Figure 1:
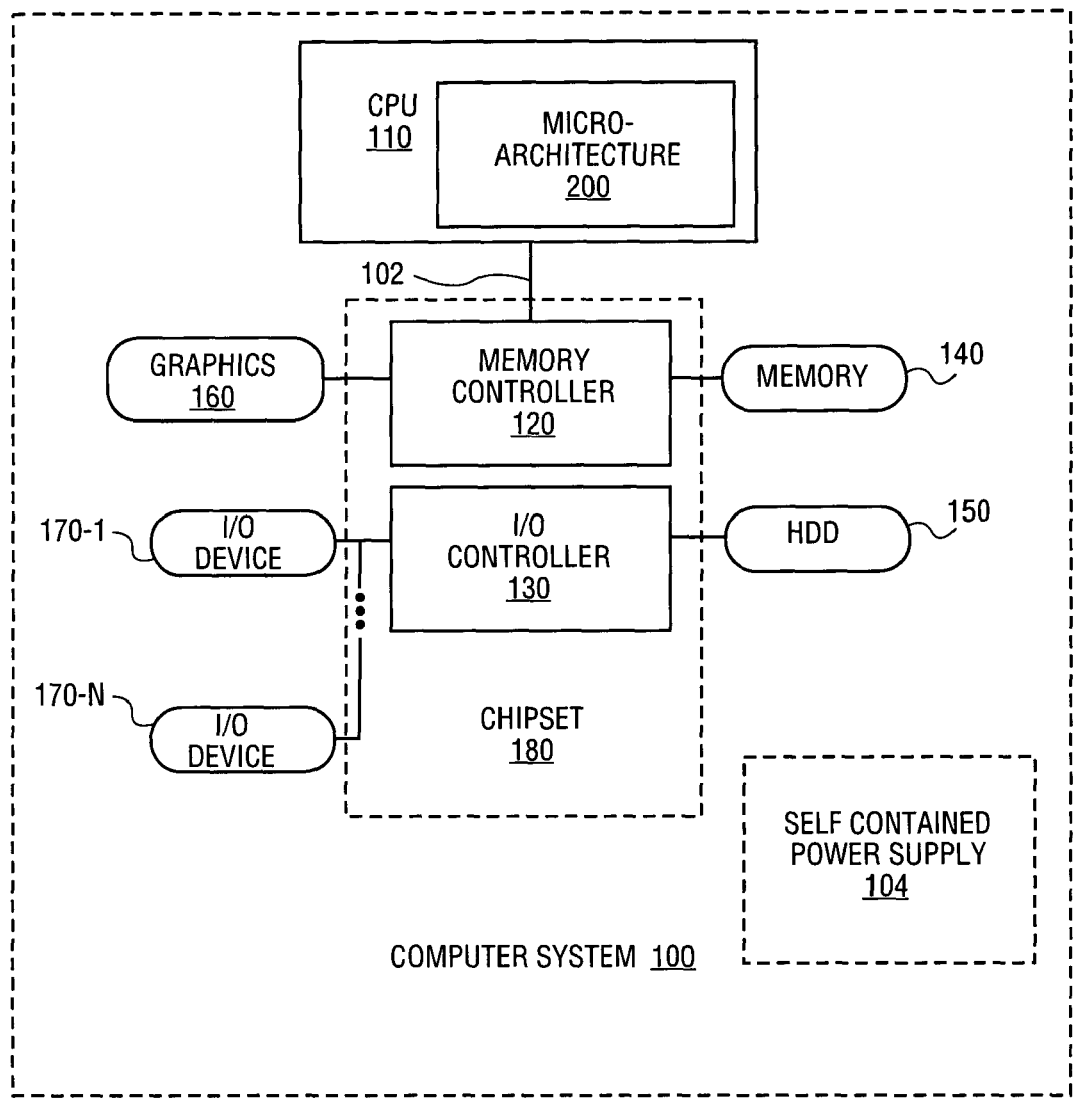
FIG. 1 is a block diagram illustrating a computer system, including a micro architecture for implementing power optimized replay, in accordance with one embodiment of the invention.

FIG. 1 is a block diagram illustrating a computer system 100 including a processor 110 having micro-architecture 200, in accordance with one embodiment of the invention. In one embodiment, micro-architecture 200 may perform power optimized replay of blocked micro-operations (uOPs), in accordance with one embodiment of the invention. Computer system 100 comprises a processor system bus (front side bus (FSB)) 102 for communicating information between the processor (CPU) 110 and a chipset 180 coupled together via FSB 102.

As described herein, the term "chipset" is used in a manner well-known to those skilled in the art to describe collectively the various devices coupled to CPU 110 to perform desired system functionality. Chipset 180 is comprised of a memory controller or memory controller hub (MCH) 120, as well as an input/output (I/O) controller or I/O controller hub (ICH) 130. Memory controller 120 of chipset 180 is coupled to main memory 140 and one or more graphics devices or graphics controller 160.

In one embodiment, main memory 110 is volatile memory, including but not limited to, random access memory (RAM), synchronous RAM (SRAM), double data rate (DDR) S-dynamic RAM (SDRAM), rambus dynamic-RAM (RDRAM), or the like. In addition, hard disk drive devices (HDD) 150, as well as one or more I/O devices 170 (170-1, ..., 170-N) are coupled to I/O controller 130 of chipset 180. As illustrated, CPU 110 includes micro-architecture 200 for power optimized replay of blocked uOPs, which is further illustrated with reference to FIG. 2.

It should be understood that embodiments of the invention may be used in any apparatus having a processor. Although embodiments of system 100 are not limited in this respect, system 100 may be a portable device that includes a self contained power supply (source) 104, such as a battery. A non-exhaustive list of examples of such portable devices includes laptop and notebook computers, mobile telephones, personal digital assistants (PDAs), and the like. Alternatively, system 100 may be a non-portable device, such as, for example, a desktop computer or a server computer not including optional source 104.

Figure 2:
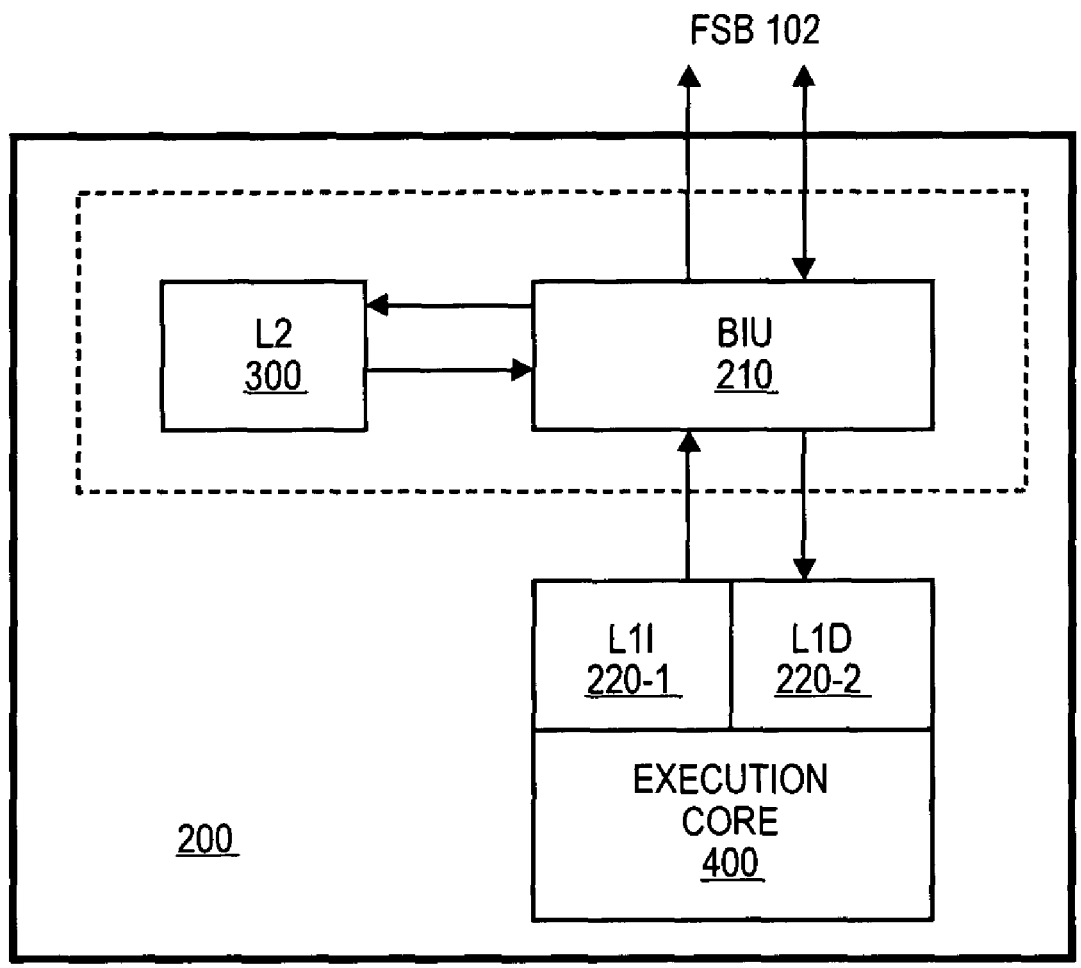
FIG. 2 is a block diagram further illustrating the micro architecture of FIG. 1, in accordance with one embodiment of the invention.

FIG. 2 illustrates micro architecture 200 of CPU 110 to show power optimized replay of blocked uOPs, in accordance with one embodiment of the invention. In the embodiment illustrated, micro architecture 200 is comprised of execution core 400, which utilizes level one (L1) cache 220, which is comprised of an instruction cache (L1I) 222 as well as a data cache (L1D) portion 224. Bus interface unit (BIU) 210 is a hub of all outbound requests from an execution core 400 as well as all inbound requests from FSB 102. The various outbound and inbound requests received by BIU 210 may be directed to execution core 400, L1 cache 220 or level two (L2) cache 300.

The various inbound and outbound requests received from BIU are processed and executed in a pipelined manner. As indicated, a pipeline structure may consist of a sequence of stages through which instructions may flow with a property that new instructions or operations can be initiated at the start of the pipeline while other operations are in progress within the pipeline. Accordingly, in one embodiment, micro architecture 200 is configured to perform dynamic execution.

As described herein, dynamic execution refers to the use of front-end or in-order-logic to fetch instructions according to program order and prepare the instructions for subsequent execution in the system pipeline. In effect, the front-end or in-order-logic supplies the high bandwidth stream of decoded macro-instructions (uOPs) to an out-of-order (OOO) core, which directs execution (actual completion) of the decoded instructions or uOPs. As such, once received, uOPs are scheduled to avoid stalling when following delayed uOPs. In other words, uOPs are executed in an out-of-order fashion when required to ensure the most efficient use of available processor resources.

Unfortunately, as indicated, uOPs within the system pipeline may encounter situations known as hazards where subsequent uOPs cannot execute until completion of a previous uOP. Examples include data hazards where a subsequent uOP needs to view the side effects of a previous uOP in order to execute. A further example is resource hazards where the later uOP need to use a resource that continues to be occupied by an earlier uOP. Collectively, the various hazards described herein are referred to as "instruction blocking condition(s)". Conventionally, hazard situations are handled by using a technique referred to as "stalling", which includes various drawbacks.

One technique for overcoming the drawbacks of stalling is replay of blocked uOPs. In accordance with a conventional replay scheme, delayed or blocked uOPs are simply placed within a queue and immediately reissued. Unfortunately, a disadvantage of traditional replay schemes arises if the hazard condition persists for substantial period of time. As a result, for hazard conditions which persist for a long enough time, the continuous replay of instructions delayed by the hazard condition may result in an increase of the power consumed by the processor, increased thermal constraints and a reduction in battery life. Accordingly, one embodiment of the invention provides optimized power replay of blocked uOPs, for example, as depicted with reference to FIG. 3.

Figure 3:
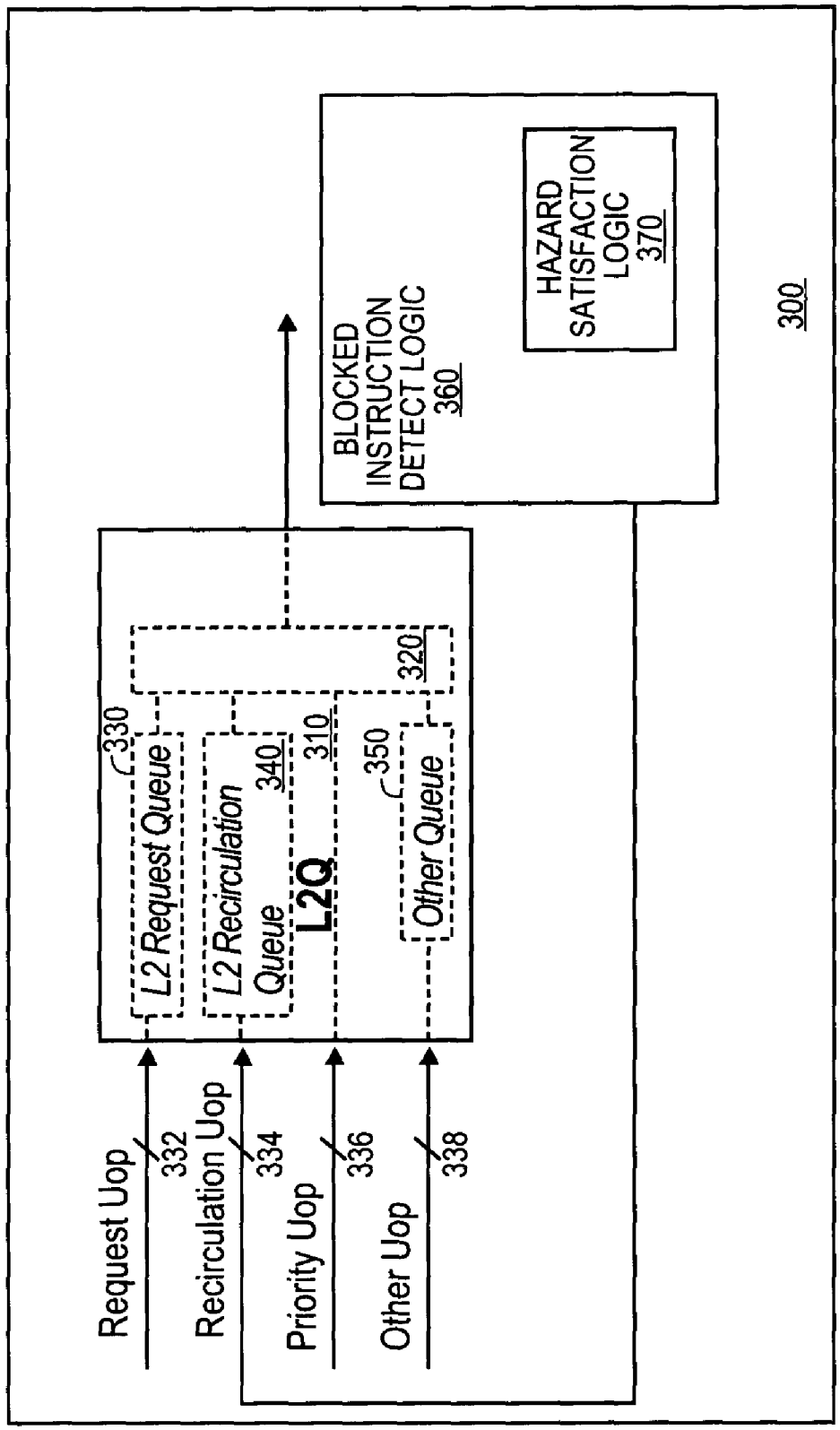
FIG. 3 is a block diagram illustrating a level two cache queue implementing power optimized replay, in accordance with one embodiment of the invention.

FIG. 3 further illustrates L2 cache 300. As illustrated, L2 cache 300 may receive various requests in the form of, for example, request uOPs 332 which request data as well as recirculated uOPs 334, priority uOPs 336 and other uOPs 338. The uOPs received by L2 cache 300 are serviced by an L2 cache queue (L2Q) 310. In the embodiment described, arbitration unit 320 selects between the various queues of L2Q 310 to issue a uOP. Once the uOP is issued, for example, to L2 cache 300, the uOP may be blocked by a blocking condition, such as a data hazard or resource hazard. When such a condition is detected, the blocked uOP is placed within recirculation queue 340 by, for example, blocked instruction detect logic 360.

As such, in the embodiment described, arbitration unit 320 selects between the recirculation queue 340, as well as the additional queues (L2 request Queue 330, other Queue 350) of L2 queue 310 with recirculation queue having a lowest priority. When a blocked uOP is placed within recirculation queue 340, the blocked uOP is designated with a blocked state. In addition, the instruction blocking condition or hazard, which is preventing the uOP from completion is also stored. Accordingly, in one embodiment, a blocked uOP is limited to issuing from queue 340 once its blocking condition no longer exists, such that its state is changed from a blocked state to an unblocked state.

Accordingly, in one embodiment, recirculation queue 340 may include one of two states; an unblocked state as well as a blocked state. In a further embodiment, certain hazards may be known to be of a short duration, referred to herein as "transient hazard condition(s)". In one embodiment, a short duration blocking condition could include back-to-back uOPs issued to the same address. The results of the first uOP might not be available during the next cycle to a second uOP. However, the result could be available two cycles later to the second uOP. Instead of stalling, the second uOP is recirculated. Accordingly, the second uOP can immediately issue the second uOP from the recirculated queue, since the blocking condition is satisfied.

Conversely, non-transient hazard conditions may include blocking conditions, which are typically memory latency and/or bandwidth bound. For example, a subsequent uOP may be delayed by a previous uOP while the uOP fetches data from memory. Likewise, a subsequent uOP may be delayed by a CPU buffer resource which is unavailable until a write to memory has completed. In one embodiment, transient hazard conditions include blocking conditions that are not bound by an "external source". For example, a uOP may fill a cache but does not know the cache coherent fill state because a bus-snoop that affects the fill state is in progress. However, the snoop is known to process in a relatively short time. As a result, if the uOP is replayed, the snoop has, most likely, completed, thereby allowing the replayed uOP to complete. Such a "snoop-in-progress" hazard is recognized as a transient hazard, having a "short duration" and does not block the associated uOP.

As such, when a uOP is blocked by a transient hazard condition, the uOP may be enqueued or placed within recirculation queue 340 with an unblocked state. In one embodiment, in order to prevent the unblocked uOP from being stalled behind various blocked uOPs within recirculation queue 340, a state of the uOPs within recirculation queue 340 is reset. In the embodiment indicated, enqueuing of a uOP with an unblocked state results in a resetting of the state of each uOP within recirculation queue 340 to an unblocked state. Arbitration unit 320 may once again reissue uOPs from recirculation queue 340 since all uOPs are then in an unblocked state.

In a further embodiment, certain logic may detect resolution or satisfaction of a data hazard or resource hazard blocking condition. In one embodiment, hazard satisfaction logic 370 detects the resolution or satisfaction of resource and data hazards. When such is detected, recirculation queue 340 is queried to determine whether a uOP within recirculation queue 340 contains a matching blocking condition. When such is detected, in one embodiment, a state of each uOP within the recirculation queue 340 is reset to an unblocked state such that arbitration unit 320 may once again continue reissuing uOPs from recirculation queue 340 referred to herein as "global unlocking".

In one embodiment, global unlocking prevents starvation of an unblocked uOP, which is queued behind one or more blocked uOPs. As such, the unblocked uOP is recirculated once each uOP, within recirculation queue 340, and ahead of the unblocked uOP, is recirculated. In other words, the global unlocking will release each blocked uOP within recirculation queue 310 such that transiently blocked uOPs or uOPs with a satisfied blocking condition are allowed to complete execution. In an alternative embodiment, resetting of the uOPs state within recirculation queue 340 is limited to uOPs which are ahead of the unblocked uOP within recirculation queue 340, referred to herein as "partial unlocking". As a result, a state of uOPs behind the unblocked uOP within recirculation queue 340 is not reset.

However, for uOPs reissued from recirculation queue 340 whose blocking condition has not yet been satisfied, such uOPs will once again be blocked and placed within recirculation queue 340 by detect logic 360. Accordingly, by providing specific conditions for resetting the state of uOPs within recirculation queue 340 to an unblocked state, continuous replay of blocked instructions having persisting blocking conditions is avoided. As a result, one embodiment retains the benefit of uOP replay by avoiding continuous replay of persistently blocked uOPs, such that the average power of a processor may be lowered, which in turn can lower thermal constraints and lengthen battery life.

In the embodiment described above, recirculation queue 340 is configured according to a first in, first out queuing scheme. However, in an alternative embodiment, recirculation queue 340 can be configured such that uOPs contained within recirculation queue 340 are issued in any desired order once placed within recirculation queue 340. According to such an embodiment, rather than unblocking all blocked uOPs upon receipt of a new unblocked uOP, in one embodiment, blocked uOPs may remain within recirculation queue 340 while allowing reissue of any unblocked uOPs, ahead of blocked uOPs within recirculation queue 340. Accordingly, those skilled in the art will recognize that various schemes for issuing blocked and unblocked uOPs from recirculation queue 340 may be implemented in accordance with the embodiments described above.

Figure 4:
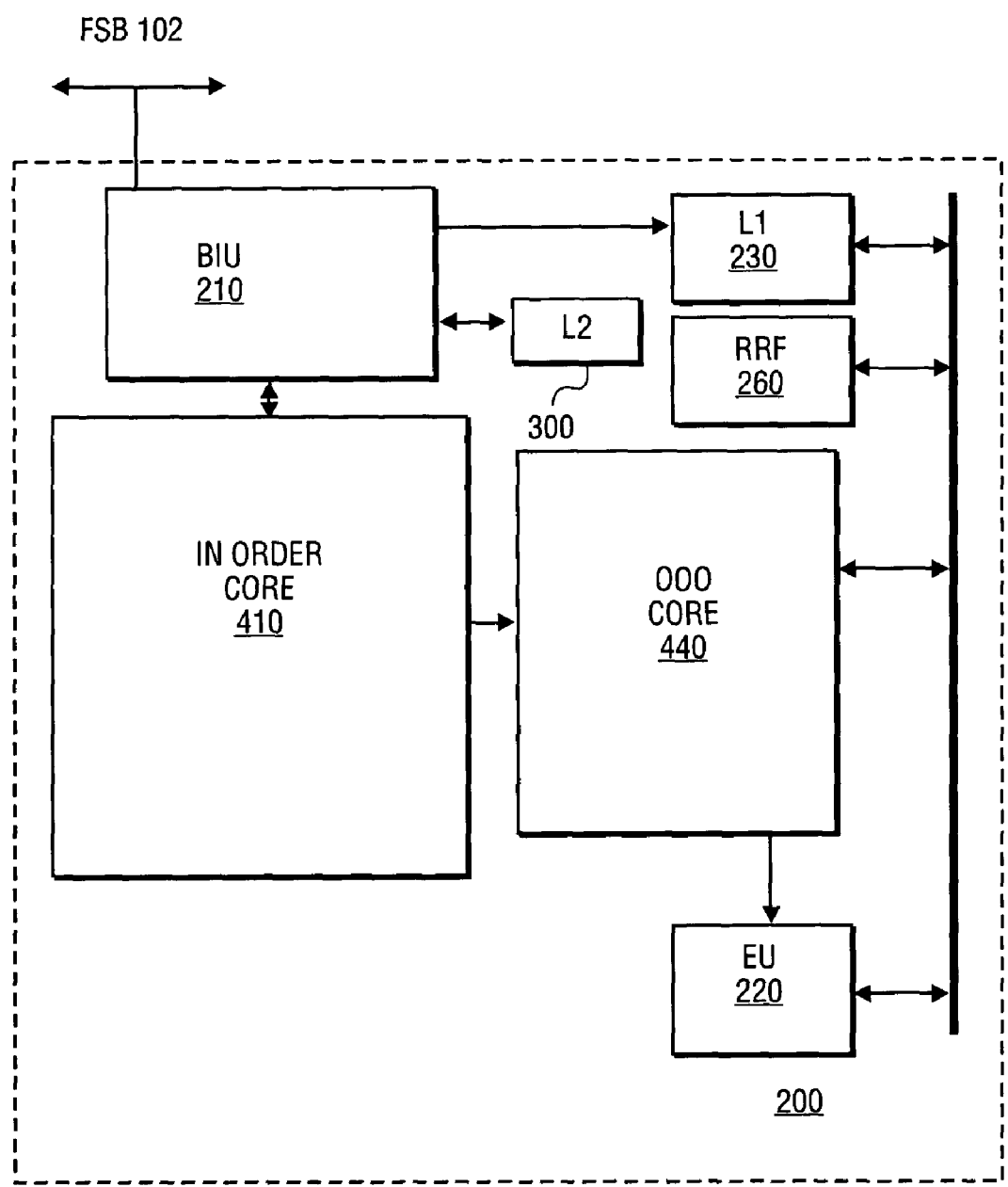
FIG. 4 is a block diagram further illustrating the micro architecture of FIG. 1, in accordance with a further embodiment of the invention.

FIG. 4 further illustrates micro architecture 200, in accordance with a further embodiment of the invention. As indicated, micro-architecture includes in-order-core 410 as well as out-of-order (OOO) core 440. In-order-core, as indicated above, provides a stream of decoded macro-instructions of uOPs to out-of-order core 440, which may schedule execution of the uOPs via execution units (EU) 220. As indicated above, the uOPs received by OOO core 440 may be delayed by various blocking conditions such as resource hazards, data hazards, or other like hazards.

Figure 5:
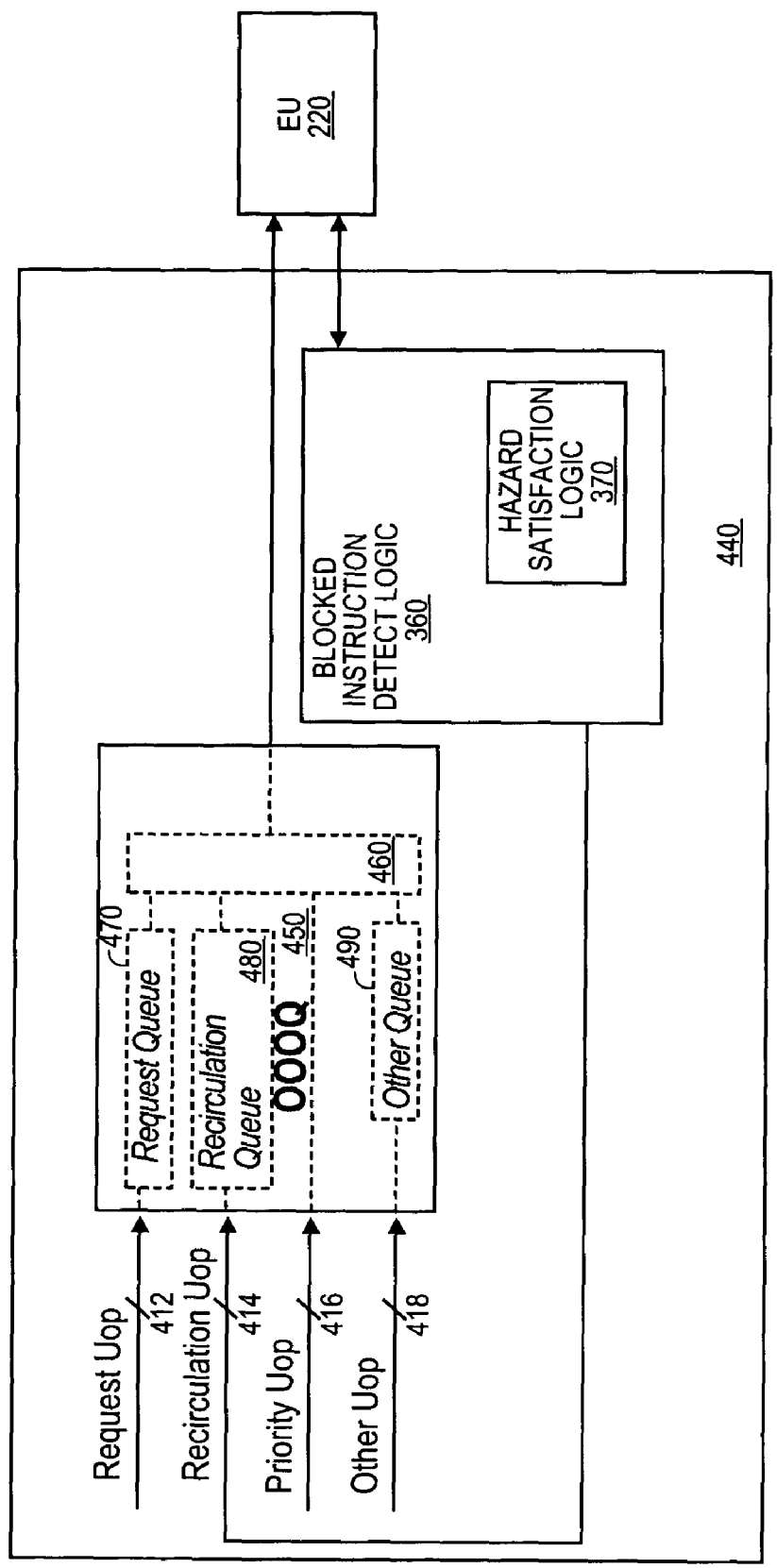
FIG. 5 is a block diagram illustrating an out-of-order queue implementing power optimized replay, in accordance with the further embodiment of the invention.

Accordingly, as illustrated with reference to FIG. 5, OOO core 440 may include a request queue 470, as well as a recirculation queue 480. As such, blocked uOPs are enqueued within recirculation queue 480 and prohibited from continuously reissuing and wasting valuable processor resources, in accordance with one embodiment. Detect logic 360 is responsible for detecting uOPs, which are blocked from completing execution by an instruction blocking condition, such as a data hazard or resource hazard and placed within recirculation queue 480. In addition, a state of the detected instruction is set to a blocked state.

Conversely, hazard satisfaction logic 370 is responsible for detecting whether an instruction blocking condition of a uOP within recirculation queue 480 is satisfied. Once the blocking condition is satisfied, a state of each uOP within recirculation queue 480 is reset to an unblocked state. As such, arbitration unit 460 may again issue uOPs from recirculation queue 480 when selected during arbitration between request queue 470, other queue 490 and recirculation queue 480. Likewise, detection of a uOP blocked by a temporary blocking condition results in a resetting of the states of the state of each uOP within recirculation queue 480 to an unblocked state.

As described above, power optimized replay is described with reference to a level 2 cache queue, as well as an out-of-order core queue. However, as will be recognized by those skilled in the art, power optimized replay, as described herein, may be performed within the various components of micro architecture 200, as depicted with references to FIGS. 2 and 4. In other words, power optimized replay may be used within components of micro architecture 200, which receive uOPs which request data or other functionality provided by the respective component. Accordingly, logic which utilizes power optimized replay of blocked instructions conserves valuable processor resources by prohibiting blocked instructions from being continuously reissued, as performed by conventional instructional replay techniques. Procedural methods for implementing embodiments of the invention are now described.

Operation

Figure 6:
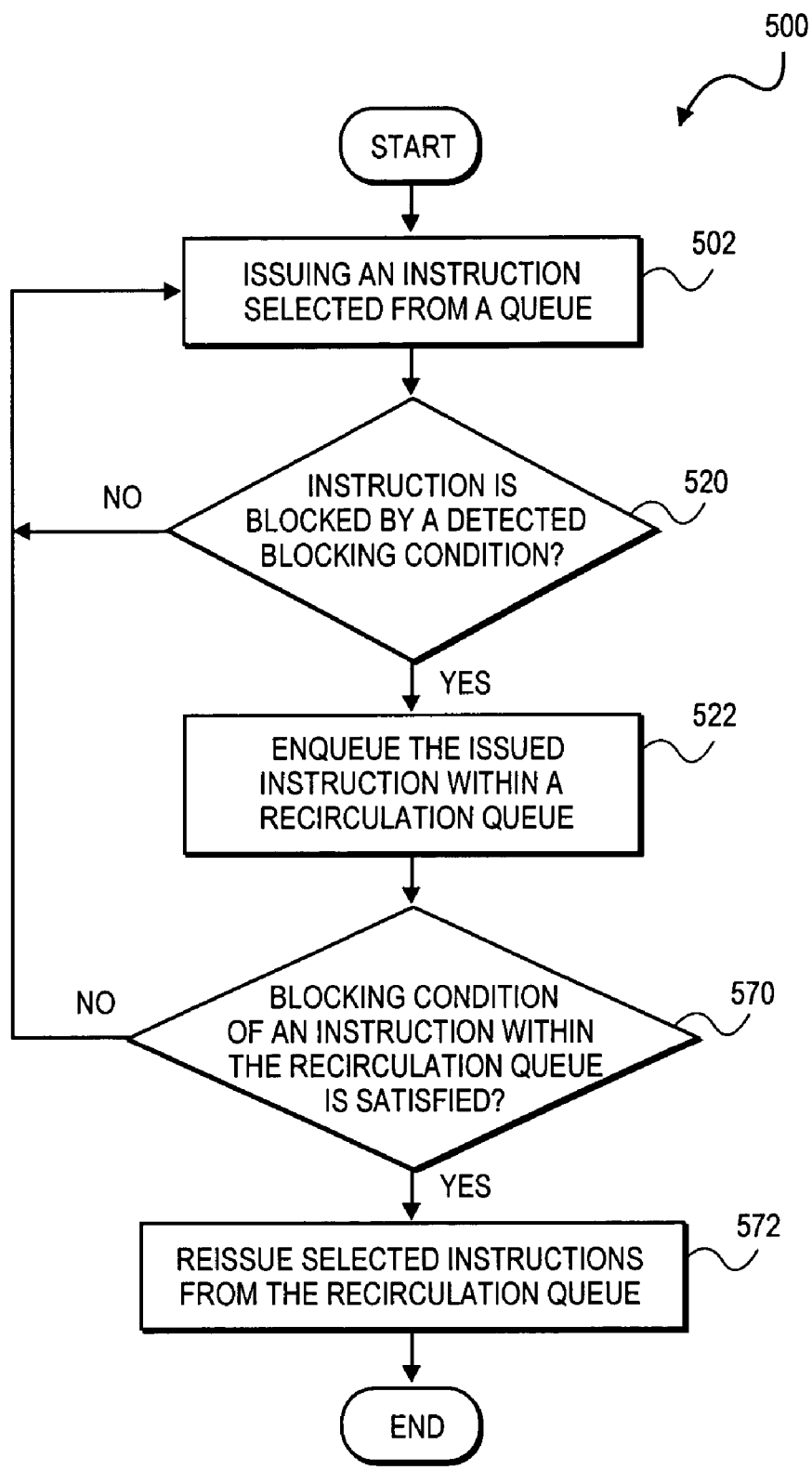
FIG. 6 is a flowchart illustrating a method for power-optimized replay of blocked instructions, in accordance with one embodiment of the invention.

FIG. 6 is a flowchart illustrating a method 500 for power optimized replay of blocked instructions, in accordance with one embodiment of the invention. At process block 502, an instruction is issued from a selected queue. For example, as depicted with reference to FIG. 3, arbitration unit 320 may select L2 request Queue 330 during arbitration and issue a current uOP within queue 330. At process block 520, it is determined whether the issued instruction is blocked by a detected blocking condition, such as, for example, using blocked instruction detect logic 360. When such is the case, at process block 522, the issued instruction is enqueued within a recirculation queue.

Although method 500, described with reference to FIG. 6, illustrates power optimized replay in a non-pipelined manner, those skilled in the art will recognize that the embodiments described herein may be directed to architectures which issue uOPs in a pipelined manner. Accordingly, in accordance with the embodiments described herein, method 500 describes an embodiment wherein optimized replay of blocked instructions is performed for parallel issued uOPs to implement system pipeline execution, as described herein. Accordingly, although method 500 is described with reference to a single uOP, those skilled in the art should recognize that the embodiment described with reference to FIG. 6 is performed in parallel for each issued uOP during a current clock cycle. In one embodiment, for example, three uOPs may be issued within a single clock cycle. Accordingly, detecting of blocking conditions and eventual reissues of unblocked uOPs is performed in parallel as uOPs are issued during each clock cycle.

In the embodiment illustrated with reference to FIG. 3, recirculation queue is a first-in/first-out (FIFO) circular queue. As further described, arbitration unit 320 is prohibited from issuing uOPs contained within recirculation queue 340 when a state of a current uOP indicates a blocked state. Accordingly, at process block 520, it is determined whether a blocking condition of an instruction within the recirculation queue is satisfied by, for example, hazard satisfaction logic 370. When such is the case, at process block 572, selected instructions or uOPs from recirculation queue may be reissued. However, once reissued, uOPs having a blocking condition, which as of yet is unsatisfied, will once again be blocked and be re-enqueued within recirculation queue 340.

Figure 7:
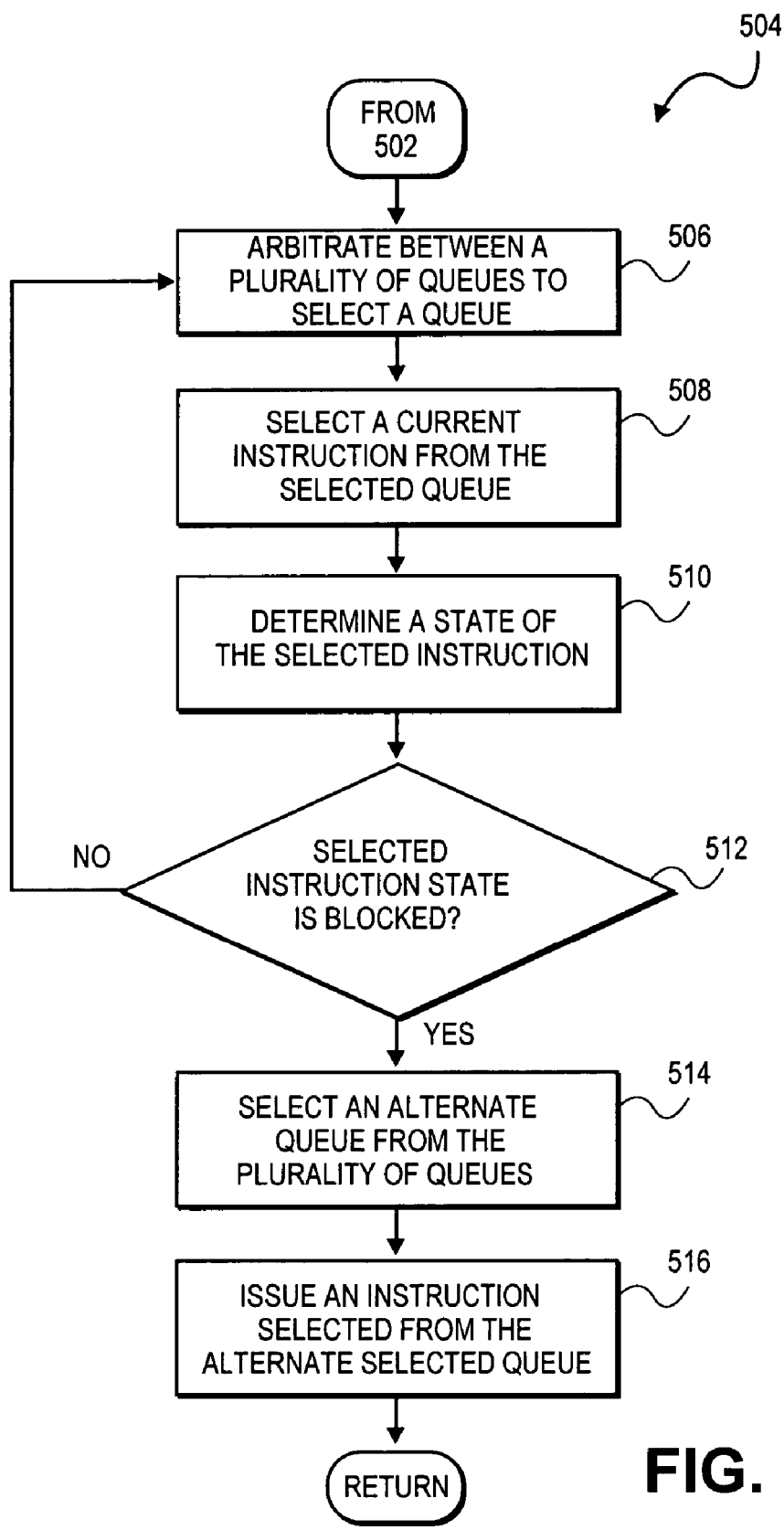
FIG. 7 is a flowchart illustrating method for issuing a selected instruction, in accordance with one embodiment of the invention.

FIG. 7 is a flowchart illustrating a method 504 for issuing a selected instruction at process block 502 of FIG. 6, in accordance with one embodiment of the invention. At process block 506, arbitration is performed between a plurality of queues to select a queue. For example, as illustrated in FIG. 3, arbitration unit 320 will select between request queue 330, recirculation queue 340 and other queue 350. In the embodiment illustrated, certain received uOPs may be designated as priority uOPs, which are immediately issued upon receipt by arbitration unit 320. In one embodiment, recirculation queue 340 is assigned a lowest priority such that a priority-based arbitration scheme is used for selecting a queue and issuing uOPs contained within the selected queue.

At process block 508, a current instruction is selected from the selected queue. At process block 510, a state of the selected instruction is determined. At process block 504, it is determined whether a state of the selected instruction is a blocked state. When a blocked state is detected, at process block 514, an alternate queue, for example, a least recently selected queue is selected from the plurality of queues. For example, as illustrated with reference to FIG. 3, arbitration unit 320 selects either request queue 330 or other queue 350 if a uOP contained within recirculation queue 340 indicates a blocked state.

In one embodiment, upon detection of a blocked uOP, arbitration unit 320 is prohibited from selecting recirculation queue 340 until a partial or global unlocking condition is detected. At process block 516, the instruction selected from the least recently selected queue is issued. In an alternative embodiment, all uOPs within, for example, a primary queue, are issued. Hence, if a uOP encounters a hazard, the uOP can be queued into recirculation queue 340 and subsequently sit in the recirculation queue 340 in a blocked state. Meanwhile, uOPs can continue to execute from the primary queue. Accordingly, uOPs are continually issued from the primary queues and periodically reissued from recirculation queue 340 as necessitated by detection of partial or global unlocking conditions.

Figure 8:
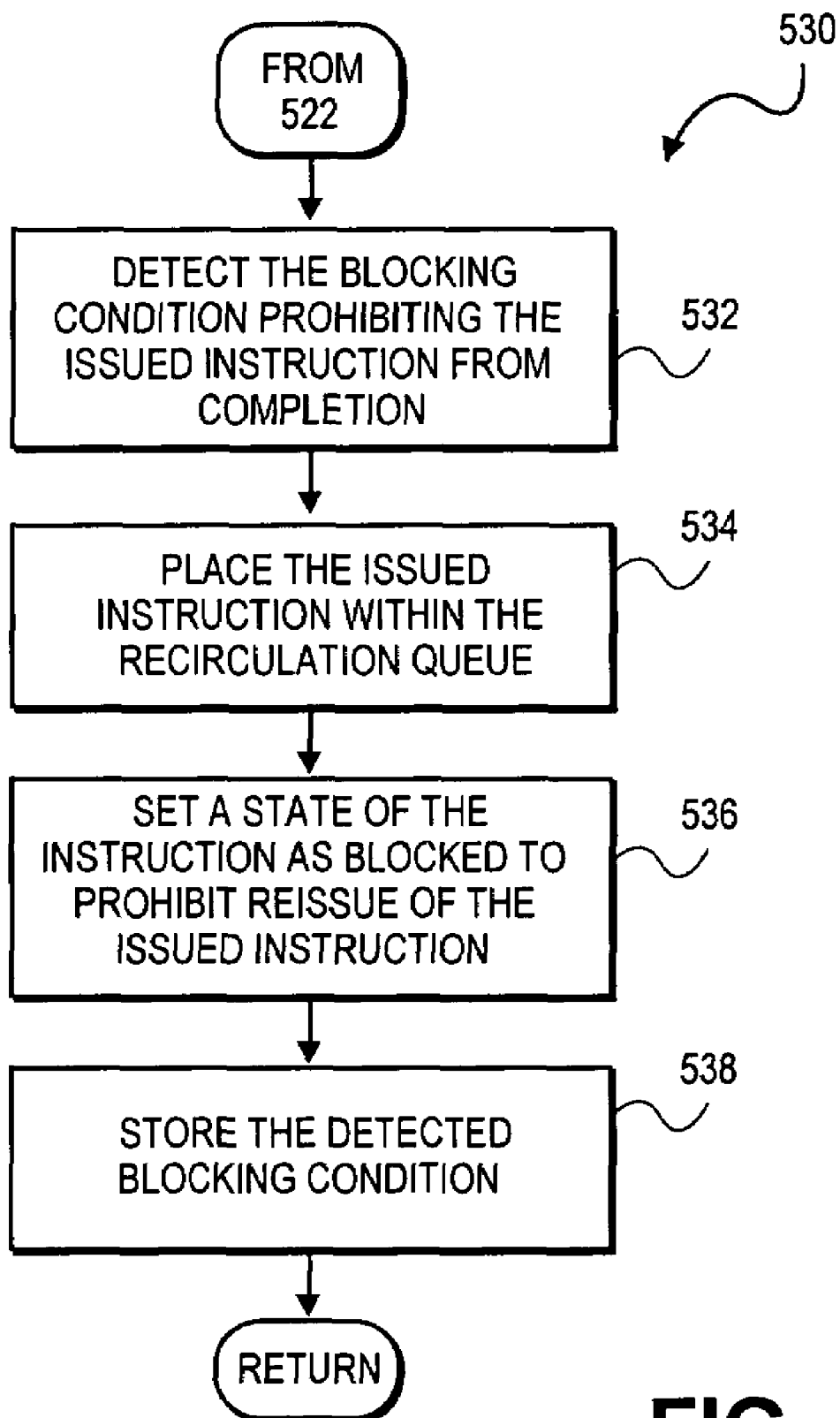
FIG. 8 is a flowchart illustrating a method for enqueuing instructions within a recirculation queue, in accordance with one embodiment of the invention.

FIG. 8 is a flowchart illustrating a method 530 for enqueuing instructions within recirculation queue of process block 522 of FIG. 6, in accordance with one embodiment of the invention. At process block 532, a blocking condition prohibiting the issued instruction from completion is detected. At process block 534, the issued instruction is placed within recirculation queue. In one embodiment, this is performed by blocked instruction detect logic 360. At process block 536, a state of the instruction is set to a blocked state to prohibit reissue of the issued instruction. At process block 538, the detected blocking condition is stored. In one embodiment, storage of the detected blocking condition enables hazard satisfaction logic to determine whether a detected blocking condition of a uOP within recirculation queue 340 is satisfied.

Figure 9:
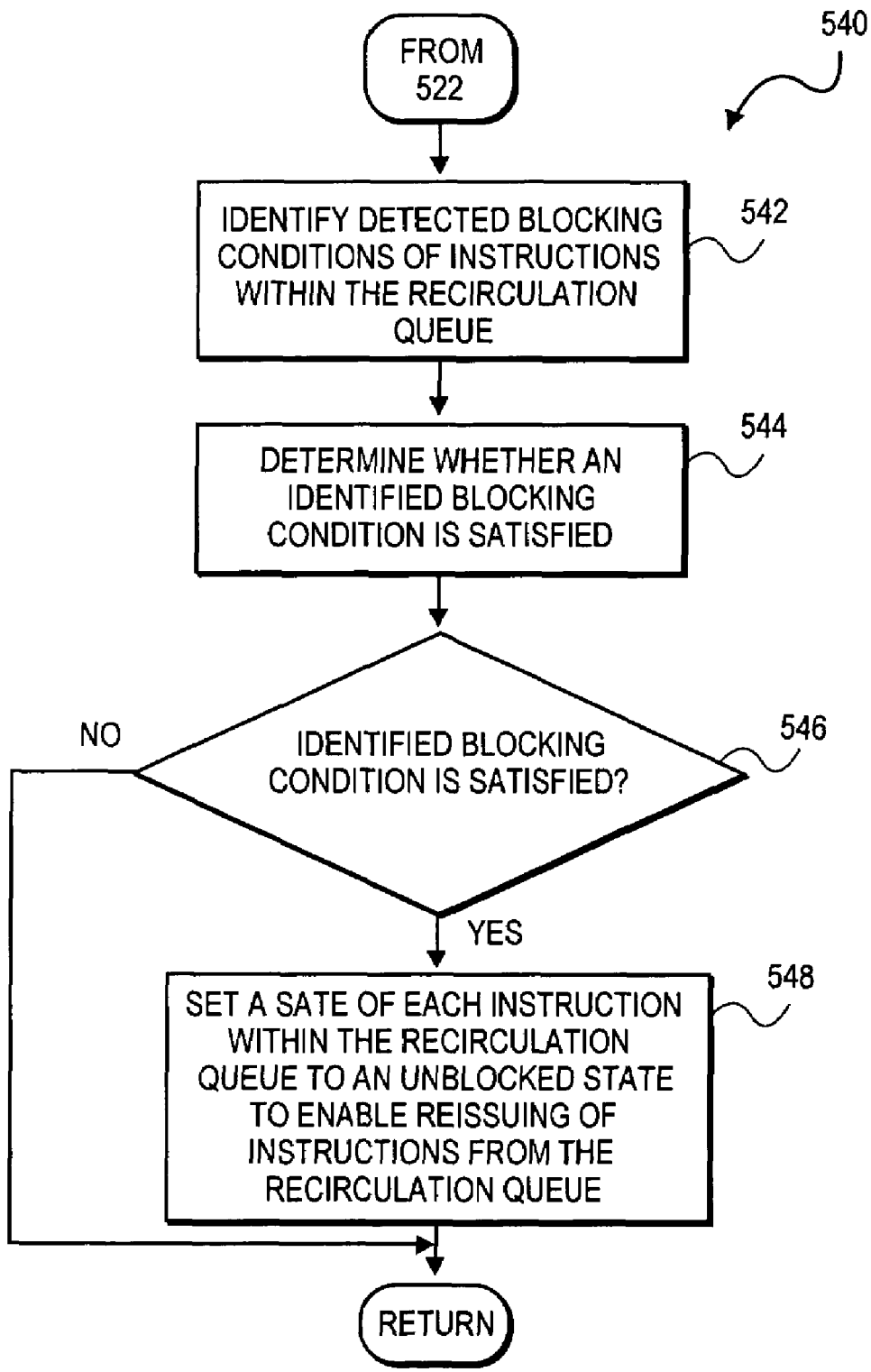
FIG. 9 is a flowchart illustrating a method for enqueuing blocked instructions within a recirculation queue in accordance with a further embodiment of the invention.

FIG. 9 is a flowchart illustrating a method 540 for enqueuing instructions within recirculation queue of process block 522 of FIG. 6, in accordance with one embodiment of the invention. At process block 542, detected blocking conditions of instructions within the recirculation queue are identified. Once identified, at process block 544 it is determined whether an identified blocking condition is satisfied. At process block 546, it is determined whether an identified blocking condition is satisfied. When such is the case, at process block 548, a state of each instruction within the recirculation queue is set to an unblocked state to enable reissue of instructions from the recirculation queue.

Figure 10:
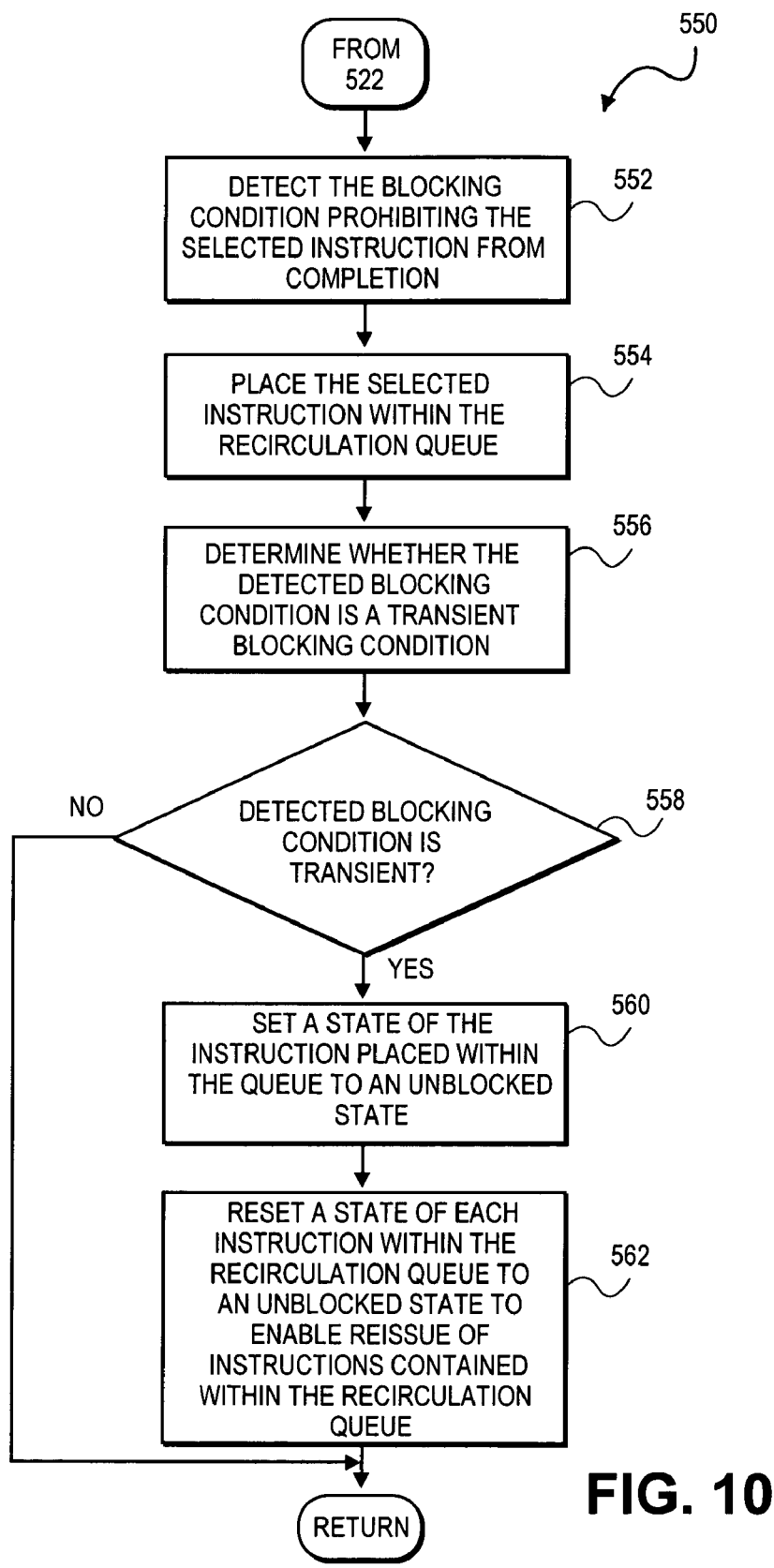
FIG. 10 is a flowchart illustrating a method for enqueuing instructions within a recirculation queue, in accordance with a further embodiment of the invention.

FIG. 10 is a flowchart illustrating a method 550 for enqueuing instructions within recirculation queue of process block 522 of FIG. 6, in accordance with one embodiment of the invention. At process block 552, a blocking condition prohibiting the selected instruction from completion is detected. Once detected, at process block 554, the selected instruction is placed within recirculation queue. At process block 556, it is determined whether the detected blocking condition is a transient blocking condition. At process block 558, when the detected blocking condition is transient, process block 560 is performed. At process block 560, a state of the instruction placed within the recirculation queue is set to an unblocked state. In addition, at process block 562, a state of each instruction within the recirculation queue is reset to an unblocked state.

As indicated above, arbitration unit 320 is prohibited from issuing uOPs from recirculation queue when the uOP contains a state indicating that the uOP is blocked. Accordingly, if a current uOP within recirculation queue 340 is blocked, arbitration unit 350 does not issue uOPs from recirculation queue 340. As a result, subsequently detected blocked uOPs are further enqueued within recirculation uOP, which continues to grow. However, as described above, in one embodiment, a global unlocking condition is performed in response to detection of an instruction blocked by a transient blocking condition. As a result, the transiently blocked uOP is temporarily delayed from immediate reissue, while arbitration unit 320 reissues uOPs ahead of the transiently blocked uOP within recirculation queue 340.

Figure 11:
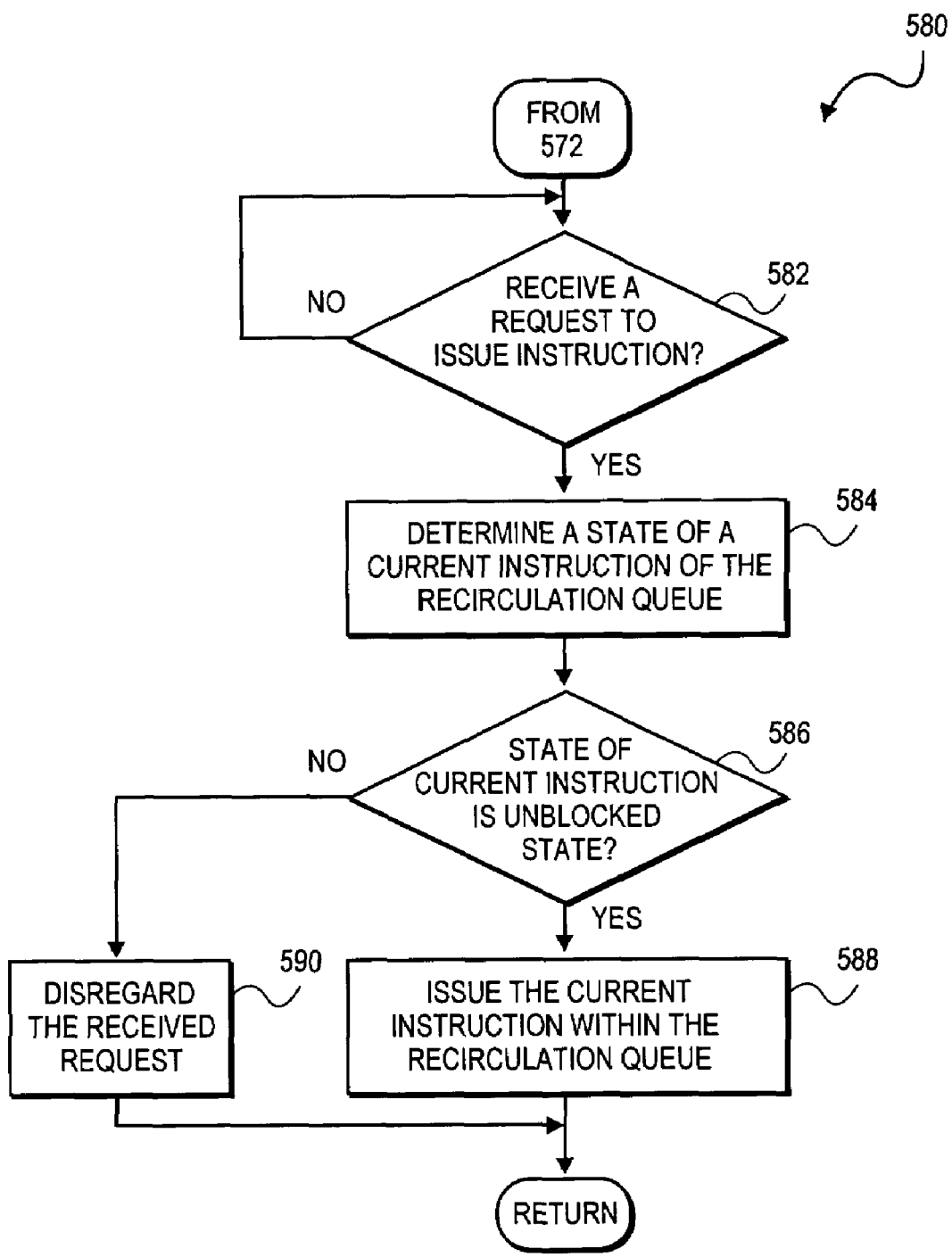
FIG. 11 is a flowchart for reissuing instructions from a recirculation queue, in accordance with one embodiment of the invention.

FIG. 11 is a flowchart illustrating a method 580 for reissuing instructions of process block 572 of FIG. 6, in accordance with one embodiment of the invention. At process block 582, it is determined whether a request to issue an instruction within the recirculation queue is received. Once received, at process block 584, a state of a current instruction within the recirculation queue is determined. Once determined, at process block 586, it is determined whether a state of the current instruction is an unblocked state. When such is the case, at process block 588, the current instruction within the recirculation queue is issued at process block 588. Otherwise, at process block 590, the received request is disregarded.

Accordingly, in one embodiment, power optimized replay, as described herein includes global unblocking conditions, which reset a state of each uOP within recirculation queue 340 to an unblocked state. As a result, arbitration logic is again able to reissue uOPs contained within recirculation queues. This global unblocking enables temporarily blocked uOPs from being unduly delayed within recirculation queue 340. In addition, when a blocking condition of a uOP within a recirculation queue is satisfied, that uOP, as well as each additional other uOP within recirculation queue is reset to an unblocked state. As a result, the uOP with the unblocked state, based on satisfaction of the blocking condition, is temporarily delayed while arbitration logic reissues uOPs which are ahead of the uOP with the satisfied blocking condition.

Figure 12:
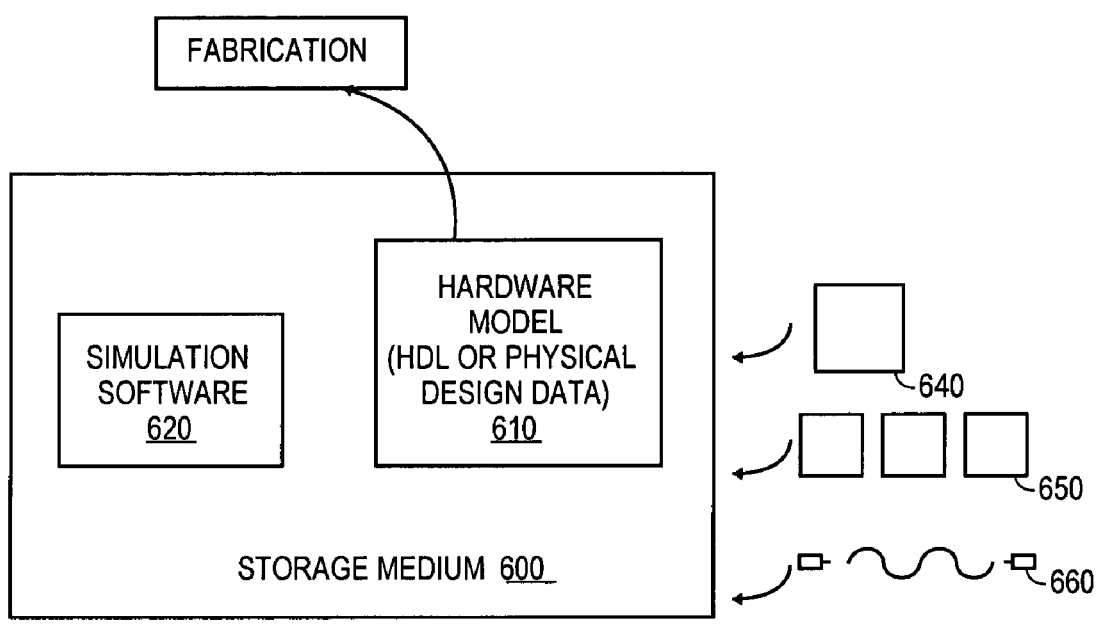
FIG. 12 is a block diagram illustrating various design representations or formats for simulation, emulation and fabrication of a design using the disclosed techniques.

FIG. 12 is a block diagram illustrating various representations or formats for simulation, emulation and fabrication of a design using the disclosed techniques. Data representing a design may represent the design in a number of manners. First, as is useful in simulations, the hardware may be represented using a hardware description language, or another functional description language, which essentially provides a computerized model of how the designed hardware is expected to perform. The hardware model 610 may be stored in a storage medium 600, such as a computer memory, so that the model may be simulated using simulation software 620 that applies a particular test suite 630 to the hardware model to determine if it indeed functions as intended. In some embodiments, the simulation software is not recorded, captured or contained in the medium.

In any representation of the design, the data may be stored in any form of a machine readable medium, such as a storage medium or carrier wave medium. An optical or electrical wave 660 modulated or otherwise generated to transport such information may define a carrier wave medium. A memory 650 or a magnetic or optical storage 640, such as a disk, may be the machine readable storage medium. Any of these mediums may carry the design information. The term "carry" (e.g., a machine readable medium carrying information) thus covers information stored on a storage device or information encoded or modulated into or onto a carrier wave. The set of bits describing the design or a particular of the design are (when embodied in a machine readable medium, such as a carrier or storage medium) an article that may be sealed in and out of itself, or used by others for further design or fabrication.

Alternate Embodiments

It will be appreciated that, for other embodiments, a different system configuration may be used. For example, while the system 100 includes a single CPU 110, for other embodiments, a multiprocessor system (where one or more processors may be similar in configuration and operation to the CPU 110 described above) may benefit from the power optimized replay of blocked instructions of various embodiments. Further different type of system or different type of computer system such as, for example, a server, a workstation, a desktop computer system, a gaming system, an embedded computer system, a blade server, etc., may be used for other embodiments.

Having disclosed exemplary embodiments and the best mode, modifications and variations may be made to the disclosed embodiments while remaining within the scope of the embodiments of the invention as defined by the following claims.

What is claimed is:

1. A method comprising:
   issuing a first instruction from a queue;
   in response to detecting a blocking condition that prevents the first instruction from being completed, determining whether the blocking condition is a non-transient blocking condition or a transient blocking condition, a transient blocking condition having a shorter duration relative to a non-transient blocking condition;
   in response to the blocking condition being a non-transient blocking condition,
      enqueuing the first instruction within a recirculation queue,
      setting a state of the first instruction in the recirculation queue to a blocked state to prevent the first instruction from being reissued from the recirculation queue, and
      in response to detecting that the non-transient blocking condition no longer exists, changing the state of the first instruction in the recirculation queue to an unblocked state to permit the first instruction to be reissued from the recirculation queue; and
   in response to the blocking condition being a transient blocking condition,
      enqueuing the first instruction within the recirculation queue, and
      setting the state of the first instruction in the recirculation queue to the unblocked state to permit the first instruction to be reissued from the recirculation queue,
   wherein the blocking condition corresponds to a hazard in which the first instruction cannot execute until completion of a second instruction issued prior to the first instruction.

2. The method of claim 1, wherein issuing the first instruction from the queue comprises:
   arbitrating between a plurality of queues to select the queue;
   selecting a current instruction from the queue; and
   issuing the current instruction from the queue.

3. The method of claim 2, wherein issuing the current instruction comprises:
   determining a state of the current instruction; and
   if the state of the current instruction is blocked, then
      selecting an alternate queue from the plurality of queues, and
      issuing an instruction from the alternate queue.

4. The method of claim 1, wherein enqueuing the first instruction within the recirculation queue comprises:
   placing the first instruction within the recirculation queue; and
   storing the blocking condition.

5. The method of claim 1, further comprising:
   identifying blocking conditions of instructions within the recirculation queue;
   determining whether any blocking condition of any instruction within the recirculation queue is satisfied; and enabling reissuance of a given instruction from the recirculation queue by setting the state of the given instruction within the recirculation queue to the unblocked state if the blocking condition associated with the given instruction is satisfied.

6. The method of claim 1, further comprising:

in response to enqueuing the first instruction in the recirculation queue due to the blocking condition being a transient blocking condition, resetting a state of all other instructions within the recirculation queue to the unblocked state.

7. The method of claim 1, wherein the hazard corresponds to a data hazard or a resource hazard.

8. The method of claim 1, wherein the recirculation queue is a first in, first out circular queue.

9. The method of claim 1, wherein the non-transient blocking condition has a duration of 1 cycle.

10. An article of manufacture including a machine readable storage medium having computer executable instructions tangibly stored thereon the instructions for:

issuing a first instruction from a queue;

in response to detecting a blocking condition that prevents the first instruction from being completed, determining whether the blocking condition is a non-transient blocking condition or a transient blocking condition, a transient blocking condition having a shorter duration relative to a non-transient blocking condition;

in response to the blocking condition being a non-transient blocking condition, enqueuing the first instruction within a recirculation queue, setting a state of the first instruction in the recirculation queue to a blocked state to prevent the first instruction from being reissued from the recirculation queue, and in response to detecting that the non-transient blocking condition no longer exists, changing the state of the first instruction in the recirculation queue to an unblocked state to permit the first instruction to be reissued from the recirculation queue; and in response to the blocking condition being a transient blocking condition, enqueuing the first instruction within the recirculation queue, and setting the state of the first instruction in the recirculation queue to the unblocked state to permit the first instruction to be reissued from the recirculation queue, wherein the blocking condition corresponds to a hazard in which the first instruction cannot execute until completion of a second instruction issued prior to the first instruction.

11. The article of manufacture of claim 10, wherein issuing the first instruction from the queue comprises:

arbitrating between a plurality of queues to select the queue;

selecting a current instruction from the queue; and issuing the current instruction from the queue.

12. The article of manufacture of claim 11, wherein issuing the current instruction comprises:

determining a state of the current instruction; and if the state of the current instruction is blocked, then selecting an alternate queue from the plurality of queues, and issuing an instruction from the alternate queue.

13. The article of manufacture of claim 10, wherein enqueuing the first instruction within the recirculation queue comprises:

placing the first instruction within the recirculation queue; and storing the blocking condition.

14. The article of manufacture of claim 10, wherein the machine readable storage medium further comprises instructions for:

identifying blocking conditions of instructions within the recirculation queue;

determining whether any blocking condition of any instruction within the recirculation queue is satisfied; and enabling reissuance of a given instruction from the recirculation queue by setting a state of the given instruction within the recirculation queue to the unblocked state if the blocking condition associated with the given instruction is satisfied.

15. The article of manufacture of claim 10, wherein the machine readable storage medium further comprises instructions for:

in response to enqueuing the first instruction in the recirculation queue due to the blocking condition being a transient blocking condition, resetting a state of all other instructions within the recirculation queue to the unblocked state.

16. The article of manufacture of claim 10, wherein the hazard corresponds to a data hazard or a resource hazard.

17. The article of manufacture of claim 11, wherein the recirculation queue is a first in, first out circular queue.

18. The article of manufacture of claim 10, wherein the non-transient blocking condition has a duration of 1 cycle.

* * * * *